US009208601B2

(12) United States Patent  (10) Patent No.: US 9,208,601 B2
Pirwani  (45) Date of Patent: Dec. 8, 2015

(54) COMPUTING PLAUSIBLE ROAD SURFACES IN 3D FROM 2D GEOMETRY

(71) Applicant: Apple Inc., Cupertino, CA (US)

(72) Inventor: Imran A. Pirwani, Campbell, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 13/689,135

(22) Filed: Nov. 29, 2012

(65) Prior Publication Data

US 2013/0328863 A1   Dec. 12, 2013

Related U.S. Application Data

(60) Provisional application No. 61/657,832, filed on Jun. 10, 2012.

(51) Int. Cl.
| | |
|---|---|
| *G06T 15/00* | (2011.01) |
| *G06T 11/20* | (2006.01) |
| *G01C 21/00* | (2006.01) |
| *G06T 17/00* | (2006.01) |
| *G06T 17/05* | (2011.01) |

(52) U.S. Cl.
CPC ............... *G06T 15/00* (2013.01); *G01C 21/00* (2013.01); *G06T 11/20* (2013.01); *G06T 11/203* (2013.01); *G06T 17/00* (2013.01); *G06T 17/05* (2013.01)

(58) Field of Classification Search
CPC ...... G01C 21/343; G01C 21/20; G01C 21/32; G01C 21/3415; G01C 21/3476; G01C 21/3638; G01C 21/3655; G01C 5/005; G06T 7/0071; G06T 17/05; G06T 17/30; G06T 19/00; G06T 2207/10016; G06T 2207/20096; G06T 2207/30181; G06T 2207/30261; G06T 2210/21; G06T 7/60; A63B 71/0605; A63C 2203/18; A63C 5/06; A63F 13/10; A63F 2300/64; A63F 2300/643; A63F 2300/8017; B60G 13/006; B60G 17/0162; B60G 17/0164; B60G 21/103; B60G 21/106; B60G 2200/144; B60G 2202/312; B60G 2202/413; B60G 2204/129; B60G 2204/13; B60G 2204/421; B60G 2204/422; B60G 2300/27; B60R 1/00; B60R 2300/304; B60R 2300/307; B60R 2300/70; B60R 2300/802; B60R 2300/8093; B60W 40/04; B82Y 15/00; G01L 19/08; G01P 1/16; G01P 3/42; G01P 3/50; G01S 11/12; G01S 11/14; G01S 13/10; G01S 13/4445; G01S 15/60; G01S 17/58; G01S 17/88; G01S 17/89; G01S 19/22; G01S 19/42; G01S 19/45; G01S 5/0263; G01S 7/4817; G01S 7/4818; G01V 7/00; G02B 26/106; G04F 8/08; G06F 17/5004; G06F 17/5095; G06F 3/017; G06F 3/0325; G06K 17/0022; G06K 2009/3225; G06K 2207/1013; G06K 7/10; G06K 7/10564; G06K 7/10584; G06K 7/10594; G06K 7/10603; G06K 7/10663; G06K 7/10673; G06K 7/10693; G06K 7/10702; G06K 7/10722; G06K 7/10792; G06K 7/10801; G06K 7/10851; G06K 7/10861; G06K 7/10871; G06K 7/10881; G06K 7/10891; G06K 7/109; G06K 7/14; G06K 9/00375; G06K 9/00651; G06K 9/00798; G06K 9/00973; G06K 9/4609; G07F 11/002; G07G 1/0054; G08G 1/005; G08G 1/096811; G08G 1/096838; G08G 1/096866; G08G 1/096872; G08G 1/164; G09B 29/007; G09B 29/10; H01L 21/28575; H01L 29/452; H04M 2242/14; H04M 2242/30; H04M 3/4872
USPC .............. 701/300, 301, 416, 436, 532; 702/5, 702/182; 703/2; 706/58; 342/123; 345/419; 382/104, 113, 284; 340/901, 937; 280/5.52; 252/373; 463/6; 235/454
See application file for complete search history.

(56) References Cited

U.S. PATENT DOCUMENTS

| | | | | |
|---|---|---|---|---|
| 3,490,019 | A * | 1/1970 | Jessen ..................... | G01S 13/10 342/123 |
| 5,832,400 | A | 11/1998 | Takahashi et al. | |
| 7,869,667 | B1 * | 1/2011 | Wu ...................... | G06K 9/4609 382/113 |
| 8,271,195 | B2 | 9/2012 | Painter et al. | |
| 2002/0070934 | A1 | 6/2002 | Sakamoto et al. | |
| 2002/0116147 | A1 * | 8/2002 | Vock ....................... | A63C 5/06 702/182 |
| 2002/0179708 | A1 * | 12/2002 | Zhu ........................ | B82Y 15/00 235/454 |
| 2004/0027344 | A1 * | 2/2004 | Ohto .................... | G06F 17/5004 345/419 |
| 2004/0049341 | A1 * | 3/2004 | Fujiwara ............ | G01C 21/3638 701/436 |
| 2004/0121829 | A1 * | 6/2004 | Reed ...................... | A63F 13/10 463/6 |
| 2004/0236506 | A1 | 11/2004 | Kolb et al. | |
| 2004/0239701 | A1 | 12/2004 | Crichton | |

| | | | |
|---|---|---|---|
| 2005/0065521 A1 | 3/2005 | Steger et al. | |
| 2005/0107993 A1* | 5/2005 | Cuthbert | G01C 21/20 703/2 |
| 2005/0196019 A1* | 9/2005 | Taniguchi | G06K 9/00798 382/104 |
| 2005/0251332 A1 | 11/2005 | Entenmann et al. | |
| 2006/0015249 A1* | 1/2006 | Gieseke | G01C 21/3415 701/416 |
| 2007/0021910 A1 | 1/2007 | Iwami et al. | |
| 2007/0114732 A1* | 5/2007 | Dellacha | B60G 13/006 280/5.52 |
| 2007/0122058 A1* | 5/2007 | Kitaura | G06T 7/0071 382/284 |
| 2007/0192020 A1 | 8/2007 | Brulle-Drews et al. | |
| 2009/0189783 A1* | 7/2009 | Koitabashi | G01S 13/006 280/5.52 |
| 2009/0216451 A1* | 8/2009 | Barnes | G01V 7/00 702/5 |
| 2009/0237269 A1* | 9/2009 | Okugi | B60R 1/00 340/901 |
| 2010/0082252 A1* | 4/2010 | Asanuma | G08G 1/164 701/301 |
| 2010/0198505 A1 | 8/2010 | Painter et al. | |
| 2010/0204916 A1* | 8/2010 | Garin | G01S 19/22 701/532 |
| 2010/0280988 A1* | 11/2010 | Underkoffler | G06F 3/017 706/58 |
| 2011/0106313 A1 | 5/2011 | Lee et al. | |
| 2011/0109482 A1 | 5/2011 | Haran | |
| 2011/0137561 A1* | 6/2011 | Kankainen | G01S 5/0247 701/300 |
| 2011/0147665 A1* | 6/2011 | Neagle | B01F 5/061 252/373 |
| 2011/0172903 A1 | 7/2011 | Farr | |
| 2012/0095682 A1 | 4/2012 | Wilson | |
| 2012/0177305 A1 | 7/2012 | Wu | |
| 2013/0332063 A1 | 12/2013 | Pirwani | |

FOREIGN PATENT DOCUMENTS

| | | |
|---|---|---|
| CN | 101353882 A | 1/2009 |
| CN | 103115609 A | 5/2013 |
| CN | 103675506 A | 3/2014 |
| EP | 1912176 A1 | 4/2008 |

OTHER PUBLICATIONS

"Aircraft Principal Axes", wikipedia article, printed on Mar. 26, 2015, 3 pages.*
Office Action mailed May 15, 2014 in U.S. Appl. No. 13/601,689, 17 pages.
Office Action mailed Oct. 10, 2014 in U.S. Appl. No. 13/601,689, 15 pages.
"Working with TIGER/Line Shapefiles," 2 pages, US Census Bureau, Jun. 2009.
Utilizing Data from American FactFinder with TIGER/Line Shapefiles in ArcGIS, 21 pages, US Census Bureau, 1990-2010.
TIGER/line Files 2000, Technical Documentation, 309 pages, US Census Bureau, Oct. 2001.
Office Action mailed Mar. 12, 2015 in U.S. Appl. No. 13/689,135, 18 pages.

* cited by examiner

*Primary Examiner* — James Trammell
*Assistant Examiner* — Sanjeev Malhotra
(74) *Attorney, Agent, or Firm* — Kilpatrick Townsend & Stockton LLP; David B. Raczkowski

(57) ABSTRACT

Road network data can include two dimensional (2D) coordinates corresponding to junctions and non-junctions in the road network. Height values for roads at junctions can be obtained from optimizing a cost function or as input. Height values for roads at non-junction locations can be obtained from a height function defined using the height values for the junctions. Pitch, yaw, and roll vectors can be obtained for non-junction locations using the height function, the 2D coordinates, and one or more road parameters, respectively. These vectors can define a coordinate frame for the road, along with which a width can provide points for defining polygons for the road. Road surface data can be constructed from the polygons. The polygons can be provided to a device display for rendering of a three dimensional image of navigation data.

26 Claims, 7 Drawing Sheets

COMPUTING PLAUSIBLE ROAD SURFACES IN 3D FROM 2D GEOMETRY

CROSS-REFERENCE TO RELATED APPLICATIONS

The present application claims priority to Provisional Patent Application 61/657,832 entitled "Computing Plausible Road Surfaces in 3D from 2D Geometry," by Imran A. Pirwani, filed Jun. 10, 2012, which is hereby incorporated by reference for all purposes. The present application is also related to commonly owned U.S. patent application Ser. No. 13/601,689, entitled "Road Height Generation For A Road Network," by Imran A. Pirwani and Paul S. McCarthy, filed Aug. 31, 2012, hereinafter Pirwani-McCarthy, which is hereby incorporated by reference for all purposes.

BACKGROUND

The present disclosure generally relates to three-dimensional road maps, and more specifically to determining features of a three-dimensional surface of a road (such as a pitch, grade, and bank of road surface). The three-dimensional maps can be provided to a navigation device for displaying road views.

A device featuring global positioning system (GPS) navigation typically receives GPS signals to determine the current location of the device. A GPS navigation system may display the location of the device relative to a road depicted in a map image to aid in navigation. For example, a navigation system may show an icon representing a vehicle in which the device is located relative to an image of a road within a map. As the device travels along a road toward an intersection (an example of a junction), the navigation system may show the icon gradually advancing toward an intersection shown in the map image. In some cases, a road of an intersection may pass over another road of the intersection. Because the navigation application displays a two-dimensional image of the intersection, it may not be possible for the driver to determine from the displayed image that a road passes over another road. And, even if the navigation device did know an ordering of the height of the roads, the image may be disorienting (e.g., the image might just show one road disappearing) since no height information leading up to an overpass (another example of a junction) is available.

Additionally, since such devices only receive two-dimensional information, the user has no visual cues about the terrain he/she will travel on or is currently traveling on, at least not from the navigation device. Given the flat two-dimensional views, providing directions and guidance via such navigational devices can be confusing. However, determining three-dimensional models of a road map is not easy unless one measures road heights at many locations, which would be very expensive.

Therefore, it is desirable to provide plausible three-dimensional (3D) road maps using existing two-dimensional (2D) road map information, e.g., just using simple ordering (stacking) information at junctions.

BRIEF SUMMARY

Embodiments of the present invention can generate a plausible 3D map of road surfaces based on a 2D map and height information (plausible or actual) at junctions. For example, the 2D map can provide a road segment as a sequence of 2D coordinates (typically of the centerline of the road) between junctions. Plausible heights at the junctions can be determined from a stacking order of roads at the junctions via an optimization algorithm, or simply read in as actual heights. Once the height of a road segment is determined at a starting junction and an ending junction, a height function for a plausible change in height of the road segment from one junction to the other can be computed to provide a height at each coordinate of the road segment.

For each 2D coordinate, a yaw vector can be determined for the vector between the coordinate and a successive coordinate. A pitch angle can be determined based on the height function at the coordinate (e.g., taken as a slope/tangent at the coordinate). A bank angle can be determined based on parameters, such as the speed limit and the yaw vector. The yaw, pitch and roll at a coordinate can define a coordinate frame that travels from one edge of the road to the other. A width of the road can be determined (e.g., as an input or based on other parameters). From the coordinate frame and the width(s) at the coordinates, polygons (e.g., triangles) can define a 3D road surface map of the road segment, including the edges and centerlines of the road segment. The polygons can be provided to a device display for rendering the 3D road surface.

According to one embodiment, a method generates polygons of a road surface for a road network area that includes a plurality of junctions. A junction data set is received for each junction in the road network area. Each junction data set includes a first coordinate and a second coordinate. A non-junction data set is received for each non-junction location in the road network area. Each non-junction location includes a first coordinate and a second coordinate. The non-junction data set defines locations of road segments between junctions. Height values of the road segments are determined at each junction. A height function defining a change in height of the road segment between the corresponding two junctions is computed for each of a plurality road segments. For each non-junction location of the road segment, a yaw vector, pitch, and roll is calculated. The yaw vector is calculated using a two dimensional vector between the non-junction location and a successive location. A road element connects the non-junction location and a successive location. The pitch is calculated using the height function at the non-junction location. The roll is calculated based on one or more road parameters. For each road element of the road segment, a set of polygons are constructed based on a road width at the two locations which the road element is between, the pitch at each of the two locations, the yaw vector at each of the two locations, and the roll at each of the two location.

Other embodiments are directed to systems, mobile devices, and computer readable media associated with methods described herein.

To better understand the nature and advantages of the present invention, reference should be made to the following description and the accompanying figures. It is to be understood, however, that each of the figures is provided for the purpose of illustration only and is not intended as a definition of the limits of the scope of the present invention.

DEFINITIONS

Figure 1:
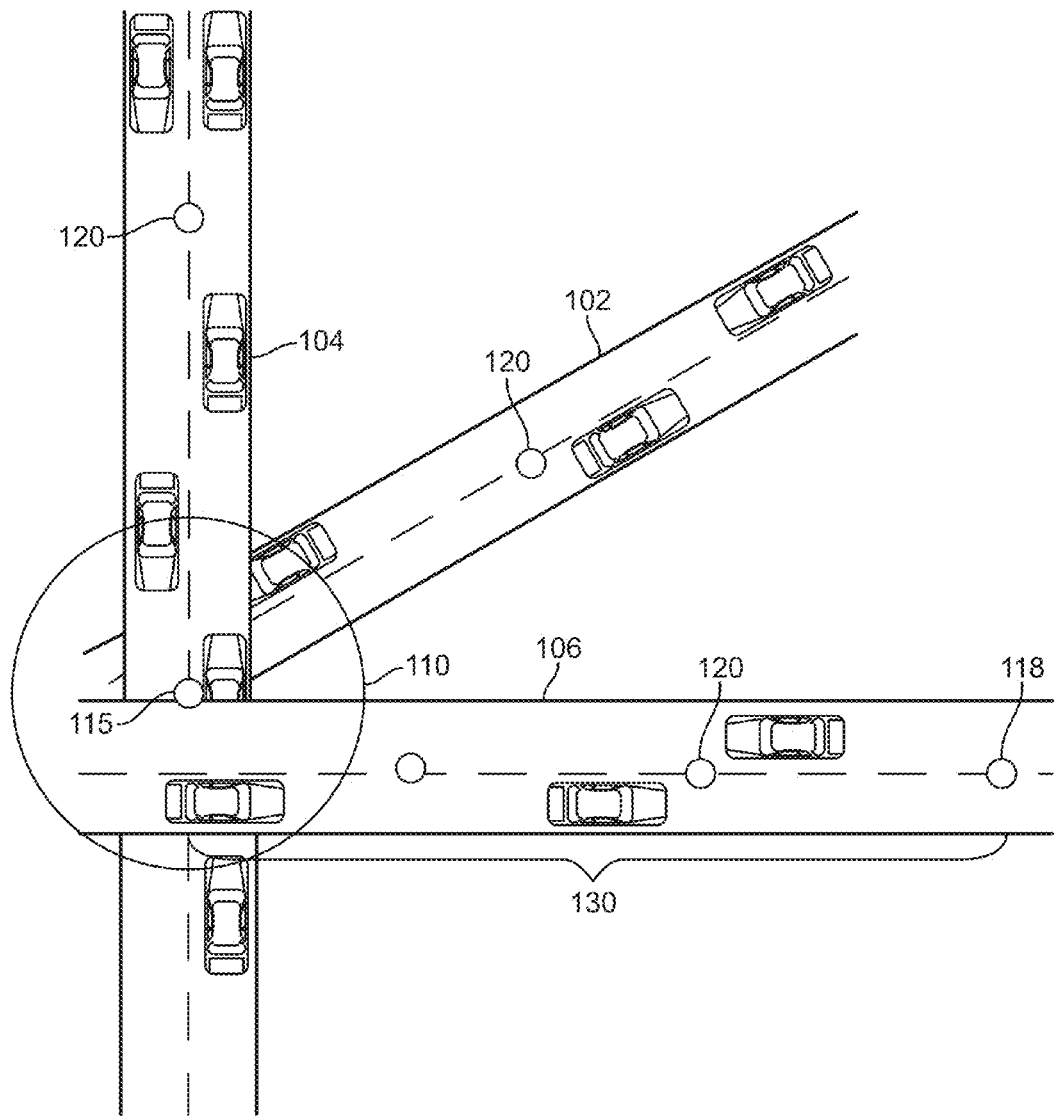
FIG. 1 shows road network data, including a grade separated crossing, obtained as 2D road map data according to embodiments of the present invention.

The term "junction" refers to any point in a road that marks a beginning or an end of a road segment. Examples of junctions include an intersection, a grade separated crossing, an end of a road, or any point between road segments where the features of a road change, such as number of lanes or name. The term "road segment" is a part of a road between two junctions. For example, a road segment can be what is normally considered a road that is between intersections of the road with other roads, or between an intersection and an end of the road. However, there can be more than one road segment between intersections. A roadway network is a collection of (road segments (polylines) and junctions that describe the topology of the polylines and the junctions. We also refer to this network as a graph. A junction may be shared geometrically by a collection of polylines as a collection of co-located points.

A Grade Separated Crossing (GSC) refers to an ordered collection of handles (or identifiers) to polylines and/or junctions. The ordering captures the notion that at the point corresponding to a given GSC, the collection is stacked in the specified ordering going from bottom-most to top-most, where successive segments in the ordering are presumed to be height separated. The GSCs as specified in the initial input may only contain polyline handles.

The road segment can be defined by an ordered collection of points (locations) on the plane where some interpolant, e.g., linear, quadratic, cubic, etc., interpolates points between a pair of consecutive points in the ordered collection. The sequence is used to model road centerlines for a given road. This object is also referred to as a polyline. A road element refers to any line or curve between two consecutive locations of a road segment.

An optimization problem can minimize a function subject to certain constraints. When an optimization problem seeks to minimize a function, a cost function is used. The term "optimal" refers to any value that is determined to be numerically better than one or more other values. For example, an optimal value determined as the result of an optimization is not necessarily the best possible value, but may simply satisfy one or more criteria (e.g., a change in a cost function from a previous value is within tolerance). The optimal solution can be one that is not the very best possible solution, but simply one that is better than another solution according to a criterion. Such an optimal solution encompasses 'near-optimal' solutions. The term 'near-optimal' is used to express the fact that in a large-dimensional optimization problem system with a large number of constraints, the exact global optimum cannot be determined by a brute force search through all possible control value combinations. It is therefore not possible to know if an optimization method produces the true global optimal solution with the lowest associated cost. In practice, however, it is often more important to determine within a reasonable amount of computational time a set of height values that have a preferably much lower predicted total cost (oscillation of a) than another set. Related to this observation, it suffices for most practical optimization problems to consider only discrete or discretized values without loss in practical value of the discovered near-optimal solutions.

DETAILED DESCRIPTION

Two dimensional road maps provide basic navigation information, but users can become disoriented, particularly at intersections or other junctions. However, true 3D maps based on images and actual height measurements would be costly. Embodiments can determine plausible 3D road surfaces based on 2D locations of roads (at junctions and non-junctions) and height values at junctions of the roads. For example, heights at non-junction locations can be computed based on user-modifiable height functions (e.g., a family of polynomials). The 3D road surface can obtained based on sampling a local coordinate frames (e.g., as defined by yaw, pitch, and roll), heights at various locations along the height function (e.g., a "lifted" spline), and road widths. This sampling can be done at discrete intervals along the height function (e.g., at discrete points of the centerline) and points derived from the sampled points (e.g., points determined to be on the edge of the road) can be connected together to yield a surface. This stitching can produce a rendering of a plausible 3D description of a road surface.

In one embodiment, a software routine takes as input a road network which expresses road inter-connections, road centerline geometries, and a collection of sequences of road identifiers which express grade separated crossings (GSCs) for locations where two or more roads cross each other at a common location, and produces output road surfaces as polygons (not necessarily planar), like ribbons in 3D space. The projection of the centerlines of these ribbons on the plane can remain unaltered. Embodiments can efficiently calculate plausible heights associated with the various sampled points along the input road centerline (polyline), and construct plausible local coordinate systems at these various sampled points along the polylines (road segments). In one aspect, no new points need to be inserted into the polyline.

I. Road Network Data

Typical GPS devices used for roadway navigation purposes generally model roads as polygonal center lines, henceforth referred to as polylines. These polylines interact with one another at points of confluence, henceforth referred to as junctions; these objects are commonly conceptualized as intersections in a roadway network. Generally, these elements form the main pieces of roadway networks, where the elements contain additional attributes such as lane properties, direction-of-flow, road class, etc. While these attributes suffice for the purposes of routing and navigation, there is a key element that is missing which make these models inadequate for the purposes of pseudo-realistic rendering in 3D: the polylines and junctions are missing information that is required in plausibly rendering the corresponding polygons as in the case of complex interchanges, overpasses, underpasses, and various grade-separated crossings (GSCs) because the elements are available only as 2D objects.

FIG. 1 shows road network data, including a grade separated crossing, obtained as 2D road map data according to embodiments of the present invention. The road data may be obtained at a map server from a vendor server. The vendor could obtain the road data by driving on roads and taking location information (e.g., GPS), by aerial imaging, or by any other suitable method. The map server and the vendor server could be the same server. The road network data can include can include 2D coordinates along each road of a road network area, e.g., a latitude and longitude pair can be provided for each road every 100 ft.

A road network area may be all roads known to a map data supplier or a subset of all roads, such all roads of a country, state, city, or other delimited area. In some embodiments, a road network area includes all roads in a particular road network map section, such as a 60 mile by 60 mile square area within a map. A road network map may be algorithmically sectioned into road network areas having uniform area, uniform road density, etc. Map sections may be selected such that the boundaries of the map section do not cross any junctions.

Grade separated crossing (GSC) 110 is junction of three roads. As a junction is the end (or start) of a road segment, GSC 110 marks an edge of six road segments. Two or more road segments may meet at a junction. An intersection is a type of junction in which two or more roads that meet at the same elevation. A grade separated crossing (e.g. an overpass) is a type of junction in which a first road is at a different height from a second road, e.g., in which a first road passes over a second road.

GSC 100 has road 102 passing under road 104 and road 106 passing over road 104. Road network data can include junction data. As shown, the three roads do not have to pass over/under each other at the exact same location in actuality, but within a certain tolerance such that they can effectively be marked at the same junction. An inherent error in location measurements can be used for such error tolerance in determining whether more than two roads are part of a same junction. GSC 100 is marked as junction 115, which has an associated 2D location.

For each road of a junction, junction data can include a location (e.g., latitude and longitude) of the junction and stacking order of the road in the junction. For example, in FIG. 1, roads 102, 104 and 106 may be assigned a stacking order of 0, 1 and 2, respectively. A stacking order of 0 can indicate that road 102 does not overpass (and is thus not "stacked" on) any other roads. A stacking order of 1 can indicate that road 104 overpasses (and is thus "stacked" on) another road. A stacking order of 2 can indicate that road 106 overpasses two roads.

A junction can also occur when there is no intersection (e.g., all roads have stacking order of 0) or a grade separated crossing. Junction 118 marks an end of road segment 130, which extends from junction/location 115 to junction 118. Besides junctions, 2D locations are obtained for non-junctions. For example, locations 120 mark 2D coordinates at points between junctions of the three different road segments shown. The 2D coordinates can be considered to lie in an X-Y plane, with height (discussed later) in the Z-axis. The height of junctions like 118 (i.e., not an intersection or GSC) may be input or measured, as no relative height information is obtained for which estimate plausible heights.

In one embodiment, a road surface generation application can estimate a height of a road relative to another road at a grade separated crossing. The road surface generation application can determine height values for roads of the road network at GSCs given only latitude, longitude, and stacking order data for the roads (e.g., as described in Pirwani-McCarthy). The height at intersections can also be estimated. The continuous change in height between such junctions can be estimated to follow a certain functional form, which may be modified by a user to provide for respective road segments. This height information can be used to display 3D surfaces of roads as the roads increase and decrease in height, which is described in the few sections. Additionally, embodiments can account for and display twists and turns in a plausible manner.

II. Overview

Figure 2:
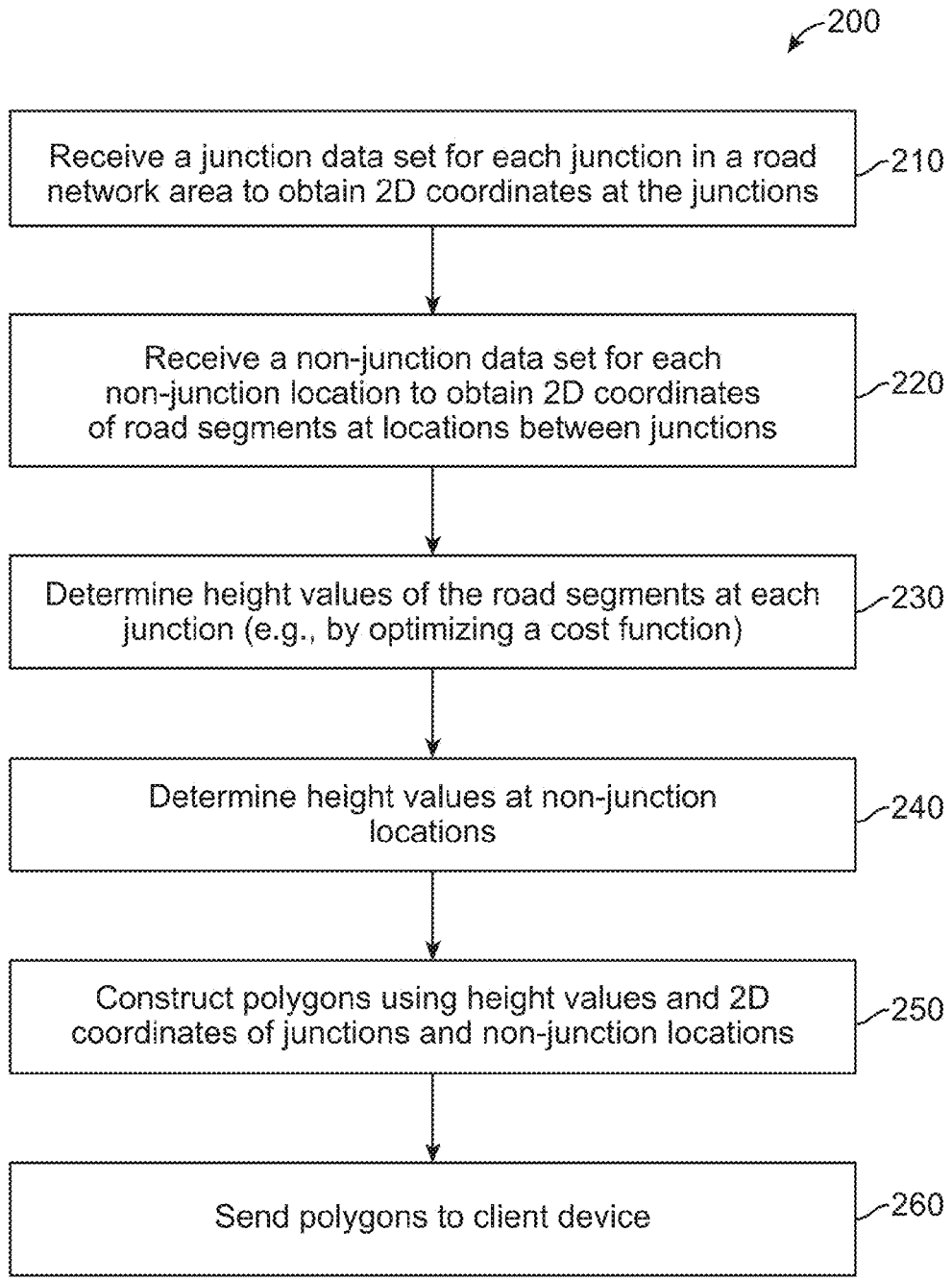
FIG. 2 is a flowchart illustrating a method for constructing a 3D road map using height information according to embodiments of the present invention.

FIG. 2 is a flowchart illustrating a method for constructing a 3D road map using height information according to embodiments of the present invention. Method 200 provides a general overview for which details are provided later. As with other methods described herein, method 200 can be performed by a computer system and certain steps may be optional and performed in a different order.

At block 210, a junction data set is received for each junction in the road network area. Each junction data set includes a first coordinate, and a second coordinate, thereby providing 2D coordinates for the junctions. These junctions are any locations where a height value can be determined from the junction data set. For example, the junction data set can include actual height information or just relative height information. The relative height information can include a stacking order for at least a portion of the junctions. For instance, the junctions can include a plurality of grade separated crossings, each including at least two roads having a different stacking order signifying that the at least two roads have different heights. The different junctions can be associated with one or more road segments, e.g., using a road designation that corresponds to a road segment.

At block 220, a non-junction data set is received for each non-junction location in the road network area. Each non-junction location includes a first coordinate and a second coordinate to define locations of road segments between junctions. The non-junction locations may occur periodically, e.g., every 100 ft along the road, or in some other pattern, or random fashion. The combination of the 2D coordinates of the junctions and non-junctions provides a 2D array of points that define the locations of roads in an X-Y plane. If the neighboring points of a road segment are connected, the result is a graph of the road network.

At block 230, height values of the road segments are determined at each junction. In one embodiment, the height values could be received as part of the junction data sets. In another embodiment, the height values at the junctions can be determined by optimizing a cost function, e.g., as described in Pirwani-McCarthy and herein. For example, the relative height value of the GSCs can be used, along with some constraints (e.g., a minimum height between roads) and the 2D coordinates, as input to a cost function. The height values at the junctions that optimize the cost function can be used as the height values for later stages.

At block 240, height values at non-junction locations are determined. In one embodiment, this can be done as part of the optimization, e.g., as described in Pirwani-McCarthy. In another embodiment, a height function can be used, as explained in more detail below. The height function can define a change in the height of the road segment between the corresponding two junctions. Besides the height functions described herein, the non-junction height values output from the optimization of Pirwani-McCarthy can provide a function, e.g., via a continuous functional approximation of the height values to provide a slope (pitch) at each non-junction location.

At block 250, polygons can be constructed using height values and 2D coordinates of junctions and non-junction locations. The polygons can be triangles or other shapes. As detailed below, the polygons can be refined based on a plausible shape (e.g., tangent plane) of the road segment at each non-junction location.

At block 260, the polygons can be sent to a client device. For example, a client device (e.g., a phone traveling in a car)

can request polygons for a portion of a road in front the car. A map server can receive the request, obtain the polygons, and send the requested polygons. In one embodiment, the map server can generate the polygons on-the-fly. In another embodiment, the map server can generate the polygons beforehand and store them, and then retrieve the requested polygons when requested.

III. Determining Heights at Junctions by Optimization

As mentioned above, embodiments can calculate height values for roads of the network area using optimization of a cost function (e.g., a convex cost function). A road surface generation application can calculate road height values subject to a set of predefined constraints on the cost function. The road height values that optimize the cost functions and satisfy the constraints can be taken as plausible height values.

Figure 3:
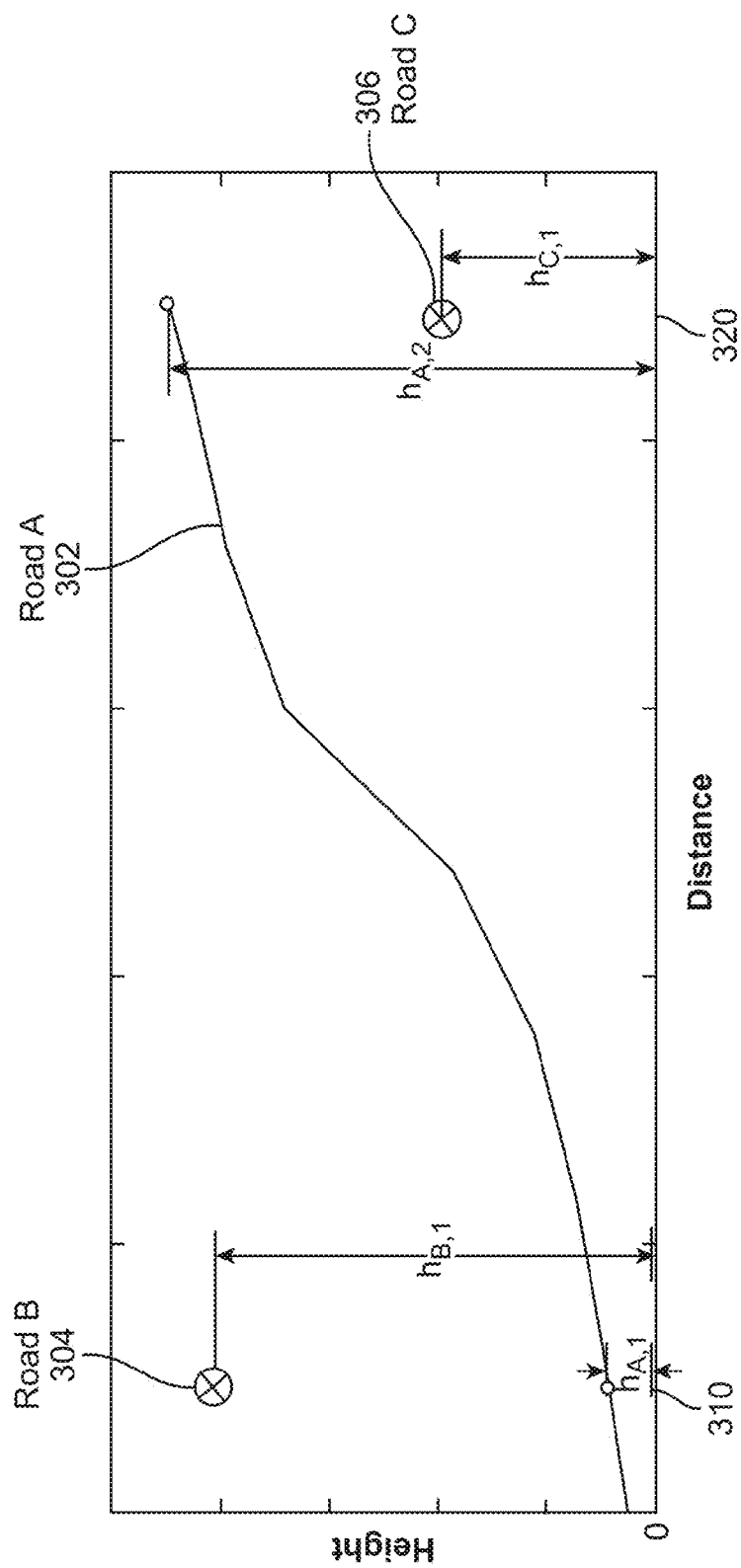
FIG. 3 is an illustrative graph showing height surface data for roads of two grade separated crossings according to embodiments of the present invention.

FIG. 3 is an illustrative graph showing height surface data for roads of two grade separated crossings according to embodiments of the present invention. The vertical axis is height (Z-axis), and the horizontal axis is distance along the X-Y plane. Two grade separated crossing are shown: GSC 310 and GSC 320. Road A is shown at 302 as a line varying in height over distance. The distance is the amount traveled on road 302 along the X-Y. For example, if Road A were completely straight, the distance from GSC 310 to GSC 320 would correspond to the distance between the X,Y coordinates (e.g., lat/long) of the two points. However, if Road A curved, the total distance would increase and would correspond to the length of the curve traced on the X-Y plane (i.e. the projection of the road onto the X-Y plane). In this embodiment, the actual path of Road A (302) is not known from the junction data set, but the path is shown for illustration.

Road B (shown passing through the plane of the page at 304) overpasses Road A (302). At GSC 310, Road A may have a stacking order of 0 and Road B may have a stacking order of 1. Road A (302) overpasses Road C, which is shown passing through the plane of the page. At GSC 320, Road C can have a stacking order of 0 and Road A can have a stacking order of 1.

The actual heights of the roads at these junctions are not known, but the order is, as mentioned above. The heights of the different roads at these junctions can be used as variables in a cost function C. The variable of the height of Road A at junction 310 is shown as $h_{A,1}$; the variable of the height of Road B at junction 310 is shown as $h_{B,1}$; the variable of the height of Road A at junction 320 is $h_{A,2}$; and the variable of the height of Road C at junction 320 is $h_{C,1}$. The cost function can then be optimized (e.g., to find a minimum or maximum value) to obtain plausible heights of the roads. The heights are not necessarily the actual heights of the roads at the junctions, but are plausible to the extent that a 3D rendering of the roads can be provided.

Accordingly, a cost function $C(h_{A,1}, h_{A,2}, h_{B,1}, h_{C,1})$ provides an output O for each set of height values (collectively referred to as H). The value of O is optimized for different values of H. The input values of H are also constrained, such that only certain values are possible. For instance, a minimum separation distance is specified so that one road must be a minimum distance above another road. For example, the value of $h_{B,1}-h_{A,1}$ is constrained to be greater than a specified value. Accordingly, a grade separation constraint can be applied to the optimization. The grade separation constraint may be a minimum height separation between roads having a consecutive stacking order in a grade separated crossing. For example, a minimum height in the range of 10-30 feet, e.g., 18 feet, may be used.

The cost function can be defined in various ways, e.g., as described below. In one embodiment, the height difference of a road at two neighboring crossings is minimized. Thus, the distance between two grade separated crossings can be an input parameter that is used in the formulation for determining the value of C at a particular value of H, which can be considered as a vector variable.

By optimizing the cost function C, height values $h_{A,1}$ and $h_{A,2}$ have been calculated at GSCs 310 and 320 along Road A based on the known stacking order of all the roads in the road network area including Roads A, B, and C. Height value $h_{B,1}$ has been calculated for Road B at GSC 310, and height value $h_{C,1}$ has been calculated for Road C at the intersection of Road A and Road C. Thus, the height values shown are possible values that might optimize C, or could be intermediate values of H that are used during the optimization process, but other values of H can provide a lower cost value (output O) than the height values shown.

A. Auxiliary Variables

In some embodiments, the road surface generation application uses various auxiliary variables as part of the optimization process. An auxiliary variable is an extra variable used in conjunction with the variable for which a value is sought (i.e., the height value variable) to improve the precision of the estimated height values. In one embodiment, the road surface generation application may determine road height values using auxiliary variables that correspond to a maximum height separation between a junction and its neighboring junctions.

In one implementation, the maximum height separation between a junction i and all of its neighboring junctions can be an auxiliary variable denoted $\sigma_i$. For example, if a 1-dimensional ball centered at a junction i having radius $\sigma_i$ covers its neighboring junction j (i.e., the other endpoint of the polyline that is incident upon i), the difference in the height values assigned to i and j differ by at most $\sigma_i$. A technique for presenting a map having plausible variance in road height values between neighboring junctions can involve adding $\sigma_i$ values over all junctions k, which causes the optimization to limit oscillations between junctions.

To obtain road height values, height values can be assigned to polyline points $h_{r,x}$ and junction height separation values can be assigned to $\sigma_i$ at the k junctions such that the following linear objective function is minimized:

$$\sigma = \sum_{i=1}^{k} \sigma_i$$

In this embodiment, $\sigma$ is used for a purpose of calculating plausible height values. The values obtained for $\sigma$ may be dispensed with after the height values are obtained and play no subsequent role outside of the convex optimization part of the algorithm. A purpose of $\sigma$ is to restrict the degree to which the polyline may oscillate in the height dimension to present a plausible and aesthetically appealing rendering of the roads by the navigation application. In one sense, the values for $\sigma$ are a function of the height variables $h_{r,x}$ since if the height variables have a greater difference with respect to the neighboring variables, then $\sigma$ will be greater.

In one embodiment, the sum of the $\sigma$ can be the entire cost function, subject to constraints. The process of determining the $\sigma$ can be done by analytically determining the maximum value for each junction using the current height values of the neighboring junctions. Alternatively, one could iteratively change the values of $\sigma$ until a constraint of maximum height separation is violated. In such an embodiment, once the values of σ are found for the current height variables $h_{r,x}$ then the sum is determined. If the sum is less than the sum for a previous set of height variables, then the current height variables can be accepted. And, then a new set of height variables $h_{r,x}$ are determined, and the iterative process continues. One skilled in the art will be aware of the various optimization techniques that can be used.

In other embodiments, other terms can exist besides the sum of σ, e.g., the heights at non-junctions as described in Pirwani-McCarthy. The constraints can also be soft constraints, which are provided as other terms in the cost function, as oppose to hard constraints where such a solution is not even possible. The soft constraint terms can increase in value as the height values deviate more from a constraint (e.g., a minimum height distance, or any of the constraints mentioned below).

B. Example Cost Function and Constraints

In one embodiment, three sets of constraints are imposed on the feasible values that these variables can acquire: (i) grade-separation constraints, (ii) coverage constraints, and (iii) non-negativity constraints (e.g., heights and auxiliary variables not being negative). A goal of the first set is to ensure that for successive junctions in any given GSC, the difference in the calculated heights needs to be at least a certain predefined, plausible threshold. A goal of the second set of constraints is to ensure that connected chains of road elements or road segments do not oscillate unnecessarily. As an example, for a fixed junction j we say that it "covers" its neighboring junction i if the difference between the heights assigned to i and j is at most the value of the auxiliary variable, $\sigma_j$ assigned to j. This enables a feasible assignment of values to the variables so that the sum of the $\sigma_j$'s is minimized. Thus, unnecessary oscillations can be penalized over a sequence of neighboring junctions. In some instances, if there are frequent oscillations, these height values that oscillate from neighboring junction to neighboring junction can form a sequence of oscillating paths that are kept.

In one embodiment, the cost function and optimization problem can be defined as follows. Associated with each road r are two variables, $h_{r,s}$; $h_{r,e}$, which correspond to the start and the end of road segment r. For a pair of distinct roads (i.e. road segments) r and r' that share a junction, the ends that share the junction are associated with a same auxiliary variable that generally can be viewed as the maximum spread in height of the height variables in the neighborhood. Thus, the number of auxiliary variables can be exactly the same as the number of junctions in the graph. In addition, this scheme can implicitly enforce the connectivity constraints in that a pair of roads have the same heights where they meet.

For a pair of junctions j and j' in a grade separated crossing C, let the "<" denote the "less than" relation. That is, j<j' states that j is below j' in C. Also, for junction j, let $N_j$ denote the set of neighboring junctions of j. The problem to be solved can be stated as:

$$\operatorname{argmin} \sum_{j \in V} \sigma_j,$$

where λ is the set of junctions and "arg min" is the minimization of the sum. The minimization is subject to the constraints:

| | | | |
|---|---|---|---|
| $h_{j'} - h_{j}$ | ≥ | λ, | $\forall j < j' \in C$ |
| $h_j - h_i$ | ≤ | $\sigma_j, \forall i: i \in N_j$ | $\forall j \in V$ |
| $h_j, \sigma_j$ | ≥ | 0, | $\forall j$ | where λ is a minimum separation distance of two road segments at a grade separated crossing.

IV. Determining Heights at Non-Junctions

As stated above, the heights at non-junctions can be determined as part of the optimization process, e.g., as described in Pirwani-McCarthy. In another embodiment, the heights could be actual measurements obtained in the non-junction data sets. However, in this section, an embodiment is described that models the height of a road segment between junctions using a plausible functional from, and use the functional form to determine the heights, as well as slope information for determining a pitch of the road. The pitch, along with curve information and a calculated bank of the road (described in later sections), can be used to provide a plausible 3D road surface.

The functions can take various forms and have various properties. The functional form typically would be continuous from one junction to the other, and the first derivative can be continuous (also referred to as smooth). In one embodiment, the function is flat at each junction. Additionally, the functions can be modified to provide differing shapes of contours for different road segments. In this manner, a designer of the road network can choose to have different shapes for different road segments. In various implementations, cubic polynomials are used, and more specifically cubic Hermite splines may be used.

Figure 4:
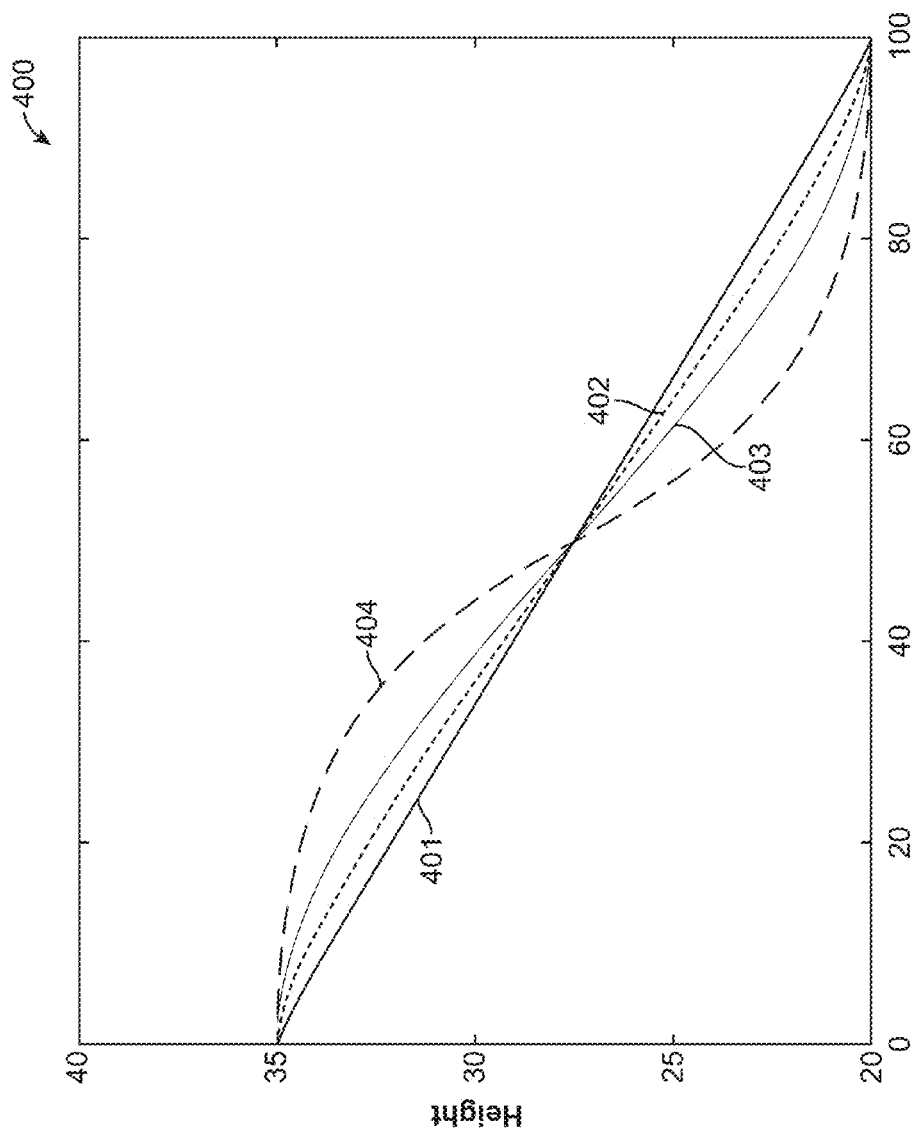
FIG. 4 shows a graph of illustrative functions for determining road height values at non-junction locations according to embodiments of the present invention.

FIG. 4 shows a graph 400 of illustrative functions for determining road height values at non-junction locations according to embodiments of the present invention. The vertical axis is height and the horizontal axis is distance along the X-Y plane. As for FIG. 3, the distance takes into account any turns left or right, and is the total distance of the road when projected onto the X-Y plane. The length is arbitrarily chosen as 100. Thus, a start junction exists at 0 and an end junction ends at 100. In one embodiment, the length is normalized as 1, and then extended to the actual length of a road segment.

As shown, the family of functions have the same value at the midpoint of 50, which is an inflection point. The slope of each function is zero at the junctions (function 401 evens out right after/before the junctions). Function 404 is the most pronounced and models a slow descent after the start junction, then a descent, and followed by a gradual curve back to flat at the end junction. These functions are modeled as a cubic Hermite spline.

In some embodiments, for any given polyline representing a road segment having different heights at its end points, the coefficients of the cubic spline can be calculated by adding two additional constraints at the end points. In one implementation, each constraint is a vector that is parallel to the Z=0 plane, having identical lengths that are proportional to the length of the polyline. For example, the length of the vectors for polyline 404 is longer than the length of the vectors for polyline 401. A goal is to capture the "slope" and "monotonicity" constraints of Pirwani-McCarthy by means of an object of small descriptive complexity. A cubic polynomial is both simple in its descriptive complexity (only four coefficients per dimension), yet adds the structure that can be used to present a plausible road model.

Example Calculation of Splines

In some embodiments, a height function (also referred to as total height function) can be defined using two different functions: a height subfunction and a transform subfunction. The height subfunction can have a uniform definition across the family of height functions that are used to portray the plausible road network. For example, the height subfunctions can have a similar shape between the two height determined at the junctions of a road segment. The transform subfunction (shape function) allows the shape to vary. In one implementation, the transform subfunction accomplishes this by transforming a normalized distance t along the 2D road segment (e.g., t would correspond to the distance in graph 400 divided by 100) to a new normalized distance t', which the height subfunction uses as an input parameter. Thus, the transform subfunction can determine t' for a given t. Such a transform subfunction can be defined in various ways, such as a single function that receives t as input and output t', or as a function of t' where the function satisfies a constraint equation based on t. In this manner, a family of height functions can be provided such that the family of height functions are well-defined, e.g., start and end at the junctions and have the determined heights at the junctions.

In one embodiment where the transform subfunction is defined in terms of t as a function of t' where the function satisfies a constraint equation based on t, the transform subfunction is modeled using one cubic polynomial l(t') and the height subfunction is modeled using a second cubic polynomial h(t'). The cubic polynomial l(t') is parameterized with a parameter $t' \in [0,1]$, where l(1) provides the distance $L_r$ traveled by the road segment in the X-Y plane from one junction to the other junction. Thus, as above, a road that coils around will have a longer distance than a road that travels directly from one junction to the other in a straight line. In one implementation, the height at a point t along the road segment can be determined by first solving $l(t')=t \cdot L_r$ for t', where $L_r$ is the length of the road segment in the 2D plane. Then, t' can be used to determine the value of h(t'). In one aspect, l(t') is monotonic to guarantee that there is only one value of t' that solves the equation.

In one implementation, $l(t')=a_l t'^3 + b_l t'^2 + c_l t' + d_l$. For a road segment r that has $L_r$ as its length in the 2D plane, which can be determined, for example, by summing the piecewise lengths of the elements of the road segment. Let $c_{r,s}$ and $c_{r,e}$ be two scalars that are functions of $L_r$, where $c_s$ and $c_e$ may be used for the sake of notational simplicity. To ensure that the value of $l(1)=L_r$ and $l(0)=0$, the coefficients can be defined as: $a_l=-2L_r+c_{r,s}+c_{r,e}$; $b_l=3L_r-2c_{r,s}-c_{r,e}$; $c_l=c_{r,s}$; and $d_l=0$. Preferably, $c_{r,e}$ and $c_{r,s}$ are appropriately chosen so that there is exactly one real solution to the equation:

$$l(t')=t \cdot L_r \quad (1)$$

Thus, l(t') has a unique value for each t', and the value of t' can be used as an input to the height subfunction. The values of $c_{r,e}$ and $c_{r,s}$ can be chosen to be different for different road segments, and thus different road segments can have different shapes.

In one embodiment, the height function h(t') can be parameterized with a parameter $t' \in [0,1]$. The height function can be defined as $h(t')=a_h t'^3 + b_h t'^2 + c_h t' + d_h$. For the road segment r let $h_{r,s}$ and $h_{r,e}$ be the two heights corresponding to its junction points, where $h_s$ and $h_e$ may be used for the sake of notational simplicity. To ensure that the value of $h(0)=h_{r,s}$ and $h(1)=h_{r,e}$, the coefficients can be defined as: $a_h=2h_{r,s}-2h_{r,e}$; $b_h=-3h_{r,s}+3h_{r,e}$; $c_h=0$; and $d_h=h_{r,s}$.

As an example, the height of the road segment can be determined as follows for a first non-junction location that is the first point in the road segment. The road can be assumed to be a straight line between the start junction and the first non-junction location, and thus the value of t can be determined from the X-Y distance from the start junction to the first non-junction location (e.g., as determined from the X,Y coordinates of the two points) and the total distance of the road segment. Equation (1) can then be solved to obtain t'. The value of t' can then be input into the height function h(t') to obtain the height. The first derivative can be obtained by inputting t' into $h'(t')=3a_h t'^2 + 2b_h t' + c_h$, which is the first derivative of the height function. In one implementation, h'(t') is used to calculated a pitch vector at a particular value of t, once it has been transformed to t'.

In one embodiment, vectors at each junction, which can correspond to $c_{r,e}$ and $c_{r,s}$, can define l(t'), and thus the total height function as it depends on l(t') and h(t'). As used in this embodiment, the vectors are flat as the tangent at the junctions, which can ensure first derivative continuity. The length of the vectors can express a velocity of the curve. For example, $l'(t')=3a_l t'^2 + 2b_l t' + c_l$, and at t'=0, the l'(t') has a value of $c_l$, which equals $c_{r,s}$. At t'=1, l'(t') has a value of $c_e$. The vectors corresponding to $c_{r,e}$ and $c_{r,s}$ can be the same length to ensure that the curve is symmetric about t'=0.5, e.g., a change in curvature (inflection point) can be set to be at the halfway point. Alternatively, one could have different values to provide asymmetric functions l(t') and h(t').

Observe that the height subfunction h(t') is completely independent of the scalars $c_{r,e}$ and $c_{r,s}$ that are used to vary the shapes of the road segments. However, note that these scalars appear in transform subfunction l(t'). Thus, the transform subfunction provides the configurability. If l(t') was linear then the total height function would always have the same shape, effectively t and t' would have the same values. However, if l(t') is non-linear then the deviation from linear can cause the total height function to become more curved. A value of l(t') that is above a line of slope $L_r$ would cause t' to be smaller than t, when $l(t')=t \cdot L_r$ is solved. Such a result would cause a total height function 402 of FIG. 4 to become total height function 403 or total height function 404, depending on how much the shift in t to t' is. Total height function 404 would result from more of a shift and would correspond to an l(t') that deviates more from linear.

In one implementation, l(t') has a shape that starts increases curves upward at first (such that l(t') is above the line of slope $L_r$), then becomes flatter at about 0.5 (such that l(t') is below the line of slope $L_r$). Thus, for uniformly sampled values of t, the corresponding values of t' will not be uniform. Rather, they will be clustered toward the ends. The effect of this clustering of t' is that when these are used as inputs for sampling heights (and corresponding slopes), the profile of the curve will be flatter at the ends of the junction, the more that l(t') deviates from linear. Choosing $c_{r,s}=c_{r,e}$ will ensure that the "take-off" is as smooth as the "landing" at the two ends.

In another embodiment, the transform subfunction could be defined as a function of t, as opposed to t'. Thus, in such an embodiment, the transform subfunction T can satisfy the following equation, T(t)=t'. Such a subfunction T can correspond to a normalized inverse of the l(t') defined above. The shape of such a transform subfunction T can be S-shaped.

In yet another embodiment, the height function can be defined directly in terms of the normalized 2D distance. For example, the height function h can be defined directly as a function of t, and thus one can simply input t into h(t) to the height and the slope by inputting into h'(t). One advantage for breaking the functional form into a separate height subfunction and a transform subfunction is that the length can be easily controlled while preserving the height values at the junctions.

V. 3D Models for Real Roads

Pirwani-McCarthy used as input the roadway network and a collection of GSCs to produce a roadway network with height values embedded in the elements which facilitate realistic and plausible rendering of the elements in 3D. The description above provides an alternative where the height values at non-junctions are defined by a function that produces plausible height values at various sampled points (e.g., along the center-line). Besides height values, embodiments can allow a determination of other structures, such as local coordinate frames that are consistent with the height values along the centerlines, which can provide a 3D depiction of the road surfaces. These local coordinate frames can be defined for particular locations in a road segment, and can be used to create a plausible 3D image of the road.

Figure 5:
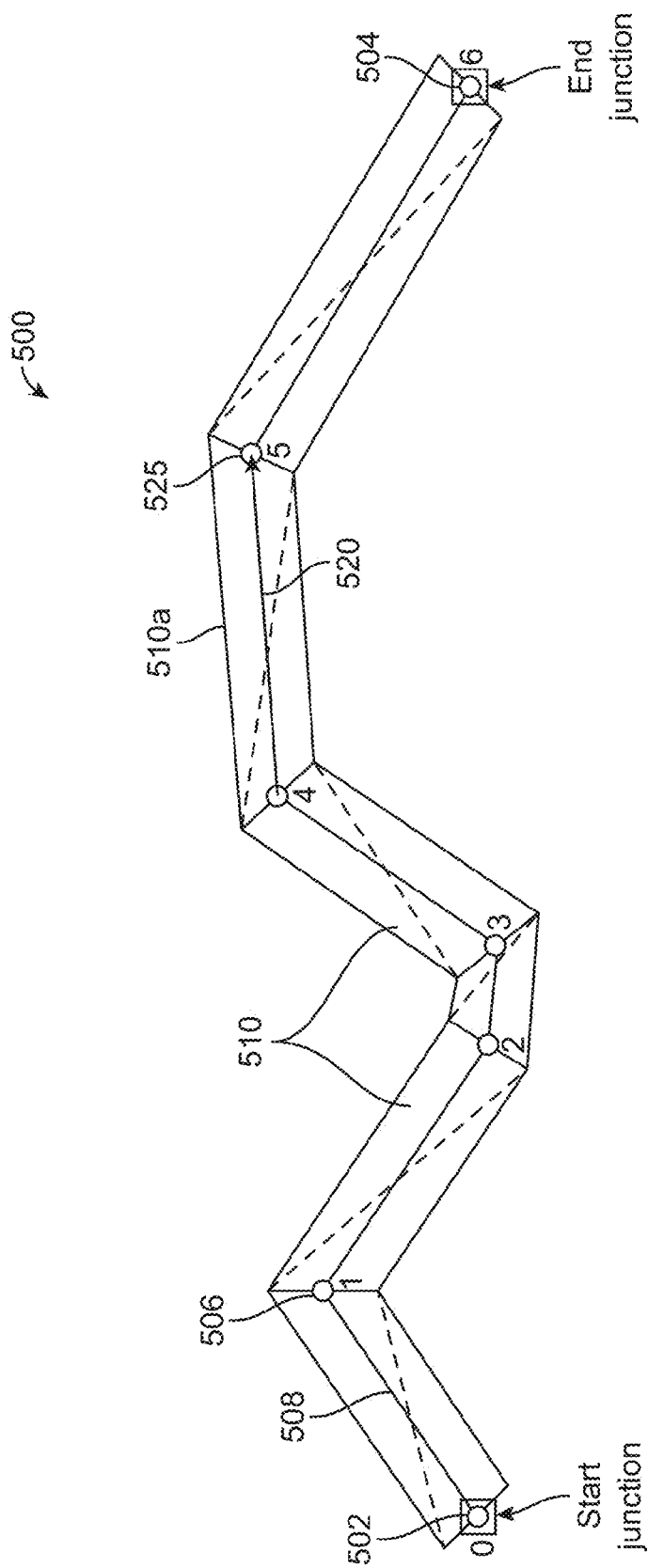
FIG. 5 is a diagram of a road surface modeled as a sequence of polygons, in accordance with an embodiment of the present invention.

FIG. 5 shows a road segment 500 between a start junction 502 and an end junction 504 in two dimensions according to embodiments of the present invention. As shown, road segment 500 is a two dimensional projection of the actual road segment, which of course lives in the 3D world. The road segment is shown as a sequence of points labeled from 1-6, with the label 6 being the end junction 504. The first non-junction location is labeled as 506. The other non-junction locations are labeled 2-5. The road segment 500 is modeled as a sequence of polygons 510. The sequence of polygons can be generated by a navigation system of a mobile device or a server according to embodiments. A three-dimensional model ("road surface") of road segment 500 is constructed from the polygons, such as the triangle shaped-polygon shown at 510.

As described above, a road dataset includes 2D coordinates (e.g., latitude and longitude) and stacking order of each road in the junction, and potentially a road identifier. Thus, for junctions 502 and 504, a height can be determined, as described herein based on the stacking order information (or simply read if available). Similarly, for non-junctions (e.g., non-junction 506), a road dataset includes a 2D coordinate (e.g., latitude and longitude) is available, and potentially a road identifier.

As one can see, road segment 500 does not travel in a straight line from start junction 502 to end junction 504. Instead, there is some level of turn at each point 1-6. Note that a road segment does not have to turn at each non-junction location. Road elements 508 extend between locations (junction and non-junction). Height values may be determined for non-junction points (e.g., using model functions or as described in Pirwani-McCarthy). The two points at the ends of a road element can thus be determined.

As shown, road segment 500 has a certain width, which may vary among the six road elements shown. Using the height function along with the 2D coordinates of each of the seven points, each of these points can be expressed as a 3D point. The 2D coordinates along with the height function can be used to determine a local coordinate frame at each of the seven points of the road segment. The local coordinate frame at each point can be defined by a yaw, pitch, and roll vector. A vector between two consecutive sampled center-line points in the 2D can be used to determine the yaw (e.g., as defined by a vector in 2D plane shown). A pitch at a particular point can be determined using a derivative of the height function (e.g., to determine an angle the road makes with a plane of constant height), as described above. A roll vector (e.g., amount of banking in the road surface) can be determined based on road parameters, such as speed limit and the curvature of the road at any given location.

A. Yaw

The yaw vector at a particular point can be determined as the vector from that point to the next point. For example, the yaw vector for point 4 is shown as the vector 520 from point 4 to point 5. Note that this definition of vector 520 assumes a modeling of road segment 500 based on a traverse from start junction 502 to end junction 504. The way that a road segment is traversed (e.g., forward or backward) can affect the local coordinate frame, but either direction can provide a plausible road surface.

The yaw vector at a particular point provides a direction for the orientation of the road surface at the particular point. For example, vector 520 informs a computer performing the rendering of the road as to a plausible direction that a car traveling from point 4 to point 5 is pointing when at point 4. The actual road may be deviate from this plausible direction, but overall vector 520 does take a car from point 4 to point 5.

The yaw vector at point 5 will have a different direction than vector 520. To address this difference, the corresponding polygons can form an edge at an angle that accounts for the next yaw vector. In this manner, the polygons can simulate a plausible flow of the road surface. For example, edge 525 of polygon 510a can be positioned to be perpendicular to the yaw vector from point 5 to point 6. However, the correspondence of an edge of a polygon to a yaw vector does not always have to be perpendicular.

B. Pitch

As described above, the pitch vector at a point can be determined as the derivative of the height function at the point. For example, the distance from point 0 to point 4 can be determined by summing the length of each of the four road elements before point 4. The parameterized value of t can be determined by dividing by the entire length of the six road elements, which can be modeled as straight lines. The value of t can then be used as described above to obtain the length of the 3D road at point 4, e.g., using the polynomial l(t') to determine the transformed distance t' that corresponds to t from the equation l(t')=t·$L_r$. The value of t' can then be used to determine the pitch angle by calculating h'(t').

C. Roll

The roll can correspond to amount of bank in a turn. For example, if the angle of a turn is more severe, typically the road would have a higher bank. The roll angle is denoted as $\beta$. In one embodiment, $\beta$ is computed as a function of the curvature at p and the speed limit along road r. Preferably $|\beta|$ is large only if both the curvature and the speed limit are high. The following can be used to calculate $\beta$:

$$\beta = k_0 \cdot B_{max} \cdot \frac{C_p}{|C_p|} \cdot \left(\frac{T_r}{T_{max}}\right)^{\gamma T} \cdot \left(\frac{|C_p|}{C_{max}}\right)^{\gamma C}$$

where $k_0$ is a scaling parameter. $C_p$ is the curvature, which can be defined as the 2D curvature (e.g., just the 2D points). The curvature can be determined using various equations that involve a second derivative.

In one aspect, $C_p$ can be a quantity that's the inverse of the concept of "radius of curvature." So, the curvature at any point along a straight segment will be small because the radius of curvature is large. For tight turns, $C_p$ would be large. Right and left curvature can have different signs. $C_p$ can be determined using standard techniques of finding the signed curvature at the vertices of a polyline. $C_{max}$ is maximum absolute curvature, such that $C_p \in [-Cmax, Cmax]$. The parameters $\gamma T$ and $\gamma C$ can have values of at least 1, e.g., $\gamma T$ can be in the single digits and $\gamma C$ in the low hundreds. These parameters can control the banking effect of the road surface at the lifted point p. $B_{max}$ is the maximum of bank. $T_r$ is the speed limit along road segment r. $T_{max}$ is a maximum speed limit.

In some embodiments, the yaw is calculated first. The yaw vector provides a specific vector in the X-Y plane. With the yaw vector determined, the computer system one can tip the yaw vector down to form an angle with the X-Y plane corresponding to the calculated pitch. The yaw vector and the bank angle can then define a place as a local coordinate frame, as described below.

D. Local Coordinate Frame (Plane of Road Surface at Non-Junction Locations)

Using the yaw, roll, and pitch vectors or angles, a plausible local coordinate frame can be constructed for junctions and non-junctions. This allows a local coordinate frame to be sampled along the polyline, enabling the construction of the road surface polygon. In one aspect, the local coordinate frame at a point can define a plane that is determined to be tangent to the road that that sampled point. A road width can be determined (e.g., assigned) and used to define an edge of a polygon.

In one embodiment, an edge of a polygon can be computed as follows. Given two consecutive sampled points along the center-line, a computer can construct local coordinate frames and determine road widths. Given the local coordinate frame and road width, points on either side of the sampled points within the respective coordinate frames can be found (e.g., two on the left, and two on the right). Each left (right) point can be half road-width away from the corresponding sample in the lateral direction with respect to the coordinate frame. The edge of the polygon can be defined by the straight line connecting the two left points and the right points, respectively.

Accordingly, to "lift" the polyline, the tangent (or "yaw") vector might not be parallel to the h=0 plane while meeting the plausibility condition of the road surface. In one embodiment, given a yaw vector $v_p$ sampled on the polyline at point p, an adjusted yaw vector $u_p$ can be obtained by lifting p by height h(t') which, in turn, is given by sampling the height function as described above. In effect, an axis A can be found by rotating $v_p$ by an amount α, which that is the pitch angle that vector h'(t') makes with a horizontal plane. The axis A can be the intersection the h=0 plane and the plane perpendicular to $v_p$. Next, axis A can be rotated by an amount $\beta \epsilon [-B_{max}, B_{max}]$ about the tangent vector, $u_p$. Once the roll β has been obtained, axis A can be rotated about $u_p$ to obtain $l_p$. These two orthogonal vectors can be used to determine a plane defined by $n_p = l_p \times u_p$. The junctions can have $n_p = <0,0,1>$, which corresponds to "up" or perpendicular to the h=0 plane. The two vectors $l_p$ and $u_p$ can be stored at each sampled point along the polyline.

VI. Generating Polygons of Real Roads

In some embodiments, the determination of polygons for the road surfaces has four phases. First, plausible height values associated with each junction are computed using a cost function, or alternatively the height values are received as an input. In one implementation, when the cost function is used, the height at non-junction location is not determined, which allows fewer variables and constraints and can provide a faster running time and lower memory requirements. Instead, a model height function can be computed, e.g., one that is monotonic by design and can have a desired property of constrained gradient ascent/descent (e.g., flat) at the start/end junctions of the road segment, creating a smooth, aesthetically pleasing and plausible effect. In one embodiment, the height function is a cubic Hermite spline.

Once the height function is obtained, the computer system can sample the height along the entire length of the polyline (road segment), as described above. Furthermore, the height function readily yields gradients at sampled points along its length allowing an estimation of plausible surface normal (e.g., local coordinate frames as described above). In conjunction with the adjusted yaw vectors along the polyline, one can obtain plausible lateral vectors (e.g., corresponding to $l_p$ as defined above). These vectors can yield local coordinate frames at any point along the centerline, enabling an expression of the road surface as ribbons in 3D space. The various normal vectors and tangent vectors can provide the 3D coordinates of the road surface once a road width is specified. With these 3D points in space, polygons can be created.

Figure 6:
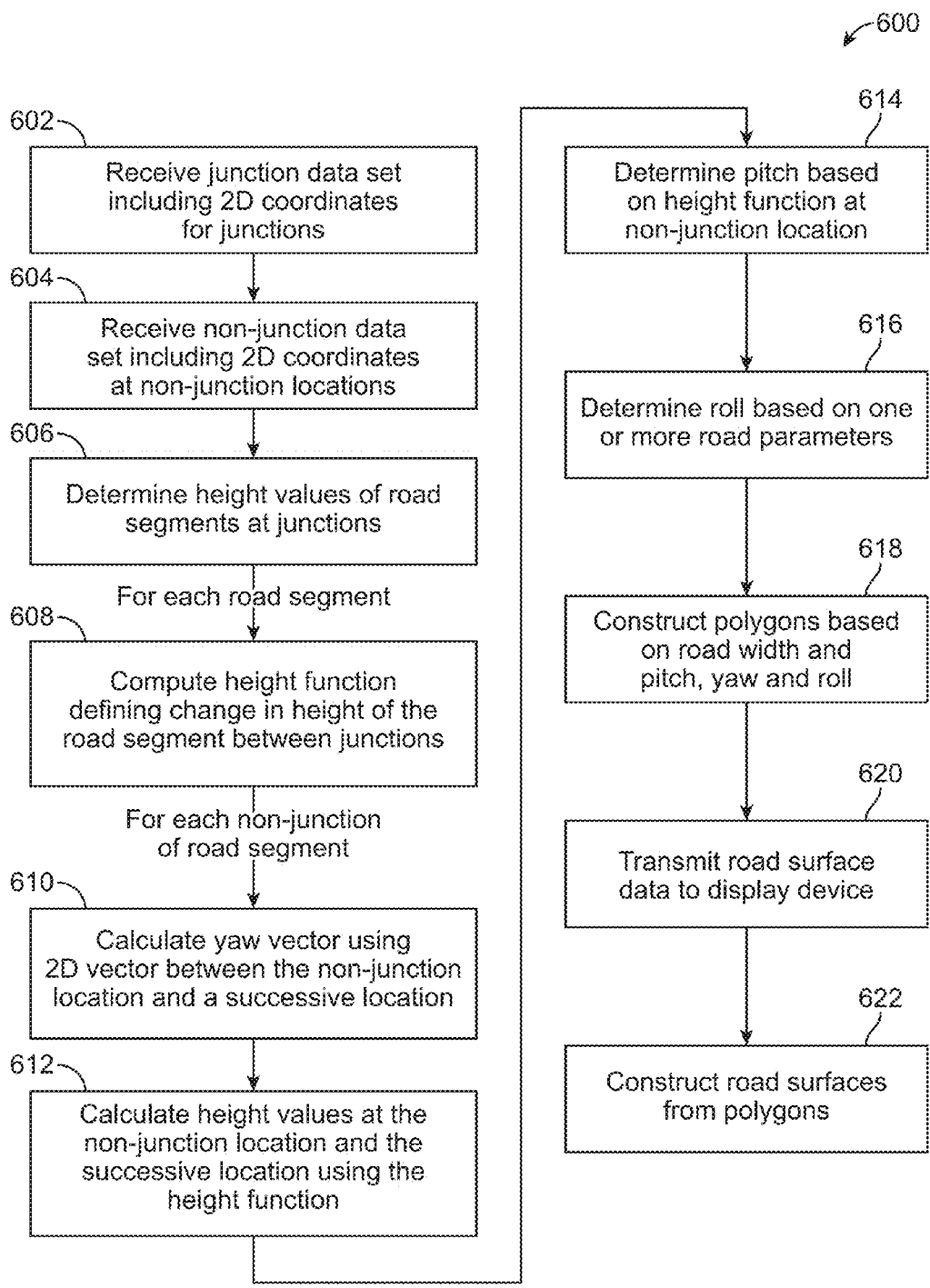
FIG. 6 is a flowchart of a method for generating polygons of a road surface for a road network area that includes a plurality of junctions.

FIG. 6 is a flowchart of a method 600 for generating polygons of a road surface for a road network area that includes a plurality of junctions. Method 600 can be performed wholly or partially by a server (e.g., a road surface generation system, which is an example of a computing device).

At block 602, road network data for each junction of a road network area is received. For example, a road surface generation application may read road network data from a storage device. Road network data can include two coordinates for specifying the position of the junctions on a 2D map, e.g., using latitude and longitude. A road designation can also be provided for each road that is at the junction, along with a stacking order of the roads for each junction. The plurality of junctions typically would include a plurality of grade separated crossings (GSCs), where a grade separated crossing includes at least two roads having a different stacking order signifying that the at least two roads have different heights at the GSCs.

At block 604, road network data at non-junction locations is received, e.g., from a storage device. Road network data at non-junction locations can include 2D coordinates (such as longitude and latitude) for identifying a position on the 2D map, along with road designation data. A road designation may be, for example, a number or name identifying a road. The non-junction locations specify the road segments that lie between junctions.

At block 606, height values of the roads of each junction are determined. In one embodiment, the height values are received as input. For example, the height values could be the result of actual measurement or provided as an approximation from another entity. In another embodiment, the height values may be determined by optimizing a cost function as described herein and in Pirwani-McCarthy. In some implementations, the optimization problem is defined using a solver. For example, a solver such as COIN-OR Linear Programming (CLP) solver may be used. A set of constraints and an objective function can be specified for use by the solver. The solver performs the optimization to solve for road height values.

As part of this step, the variables of a cost function can identified based on the location of each junction and stacking order of each road in a grade separated crossing. For example, the number of grade separated crossings can be identified (along with the number of roads at the crossings) to determine a number of height variables. The constraints for the height values can also be identified in this block. This may be done by receiving a routine that defines the constraints (e.g., a routine that provides a Boolean result of whether a particular set of height values violate the constraints, and potentially an identification of which height values violate the constraints).

At block 608, for each of a plurality road segments, a height function defining a change in height of the road segment between the corresponding two junctions is computed. The height function can be of various functional forms. In one embodiment, the function has terms of order three (cubic) or higher. Examples include the family of sigmoid functions and cubic polynomials. The height function can be computed, e.g., by obtaining (e.g., reading) coefficients from a storage device.

At block 610, for each non-junction location of the road segment, a yaw vector is calculated using a two dimensional vector between the non-junction location and a successive location (non-junction or junction). For example, at point 1 of a road segment, a yaw vector may be determined using the 2D vector from point 1 to point 2 (e.g., just using the 2D coordinates and not the height values). A road element can connect the non-junction location and the successive location.

At block 612, the height values at the non-junction location and the successive location are calculated using the height function. The height values can be obtained as described herein. In one embodiment, a normalized 2D distance (e.g., between 0 and 1) of a location from a start junction can be used to determine a 3D distance (which may be normalized) to the location along the 3D road (e.g., using a length function). The normalized 2D distance can be obtained by dividing the arc-length of the portion of the road segment leading up to the sampled point, by the total arc-length of the road segment. In another embodiment, the height function can be defined directly in terms of the normalized 2D distance. For example, the height function h can be defined directly as a function of t, and thus one can simply input t into h(t) to the height and the slope by inputting into h'(t). In other embodiments, the height function can include a transform subfunction and a height subfunction, as described herein.

At block 614, a pitch is determined using the height function at the non-junction location. In one embodiment, a pitch angle is determined by calculating the slope of the height function at the non-junction location. For example, the first derivative of the height function at the non-junction location can be determined to provide the slope. The slope will form an angle with the horizontal plane, and the angle can be used as described herein. In another embodiment, a vector from the 3D point of the non-junction location to the 3D point of the successive location can be used to determine the pitch angle with the horizontal plane. For example, a 3D vector between the two locations can be determined, and the angle between this vector and a plane of constant height can be determined. This angle can be used to define the pitch angle.

At block 616, a roll is determined based on one or more road parameters. An example of determining the roll is provided above. The roll provides the direction and how much a road surface is banked. If the speed limit is high and the angle between the vector between a previous location and the current location and the vector between the current location and the successive location is large (e.g., curvature at the current location is high), then the road would need to be banked more as well. The combination of yaw, pitch, and roll can define a local coordinate system at each location for creating polygons. The local coordinate system can define a plane that represents the road at the sampled point. Such a plane could be stored at two 3D vectors that define the plane, e.g., a yaw vector titled by a pitch angle and a second vector perpendicular to the tilted vector, where the second vector is in a plane defined by the roll angle.

At block 618, for each road element of the road segment, a set of polygons is constructed based on: a road width at the two locations which the road element is between, the pitch at each of the two locations, the yaw vector at each of the two locations, and the roll at each of the two locations. For example, the vectors and the road width can be used to define the 3D coordinates of the edge of the road corresponding to the centerline location. These edge points (and potentially the centerline coordinate) can be used to construct the polygons. These polygons can be of various types, such as triangles. Once the polygons are created, they can be stored and then transmitted to a device for rendering a 3D view that includes the road surface. The height values at the two locations can be used to determine polygons to be at the correct height.

The coordinate frames (e.g., as defined by the set of yaw, pitch, and roll) at consecutive sampled points on the polyline can be stored, along with the road widths at the sampled points or an total road width associated with the road segment. The road width can be inferred using other important road features such as road class, number of lanes, speed limit, and other road attributes. The coordinate frames can be used to construct a sequence of polygons that are aligned with the coordinate frames. In one embodiment, $W_r$ can the width of road r. For a point p on the polyline, two points can be constructed that are at a distance $W_r/2$ on either side of p along $l_p$, as denoted by $right_p$ and $left_p$. Next, triangles can be added to a sequence of polygons for road r, defined, for example, as: ($left_p$, $right_p$, $left_{p+1}$) and ($left_{p+1}$, $right_{p+1}$, $right_p$), to finish the construction.

At block 620, the polygons can be transmitted to a display device. For example, a road surface generation system may transmit the road surface data to mobile device, which can display navigation data generated using the road surface data on a display. The polygons can be sent to the mobile device in response to a request for navigation information. The mobile device may be getting near a road segment and need the polygons to display the road in a plausible 3D manner. Such a request can happen at various times before the mobile device reaches the road segment, e.g., when a route is first established or when the mobile device is within a specified distance.

At block 622, road surfaces can be constructed from the polygons. The mobile device can have rendering software that uses the polygons, along with any other positional information to display a plausible 3D image of the road.

VII. Portable Device and Server

Figure 7:
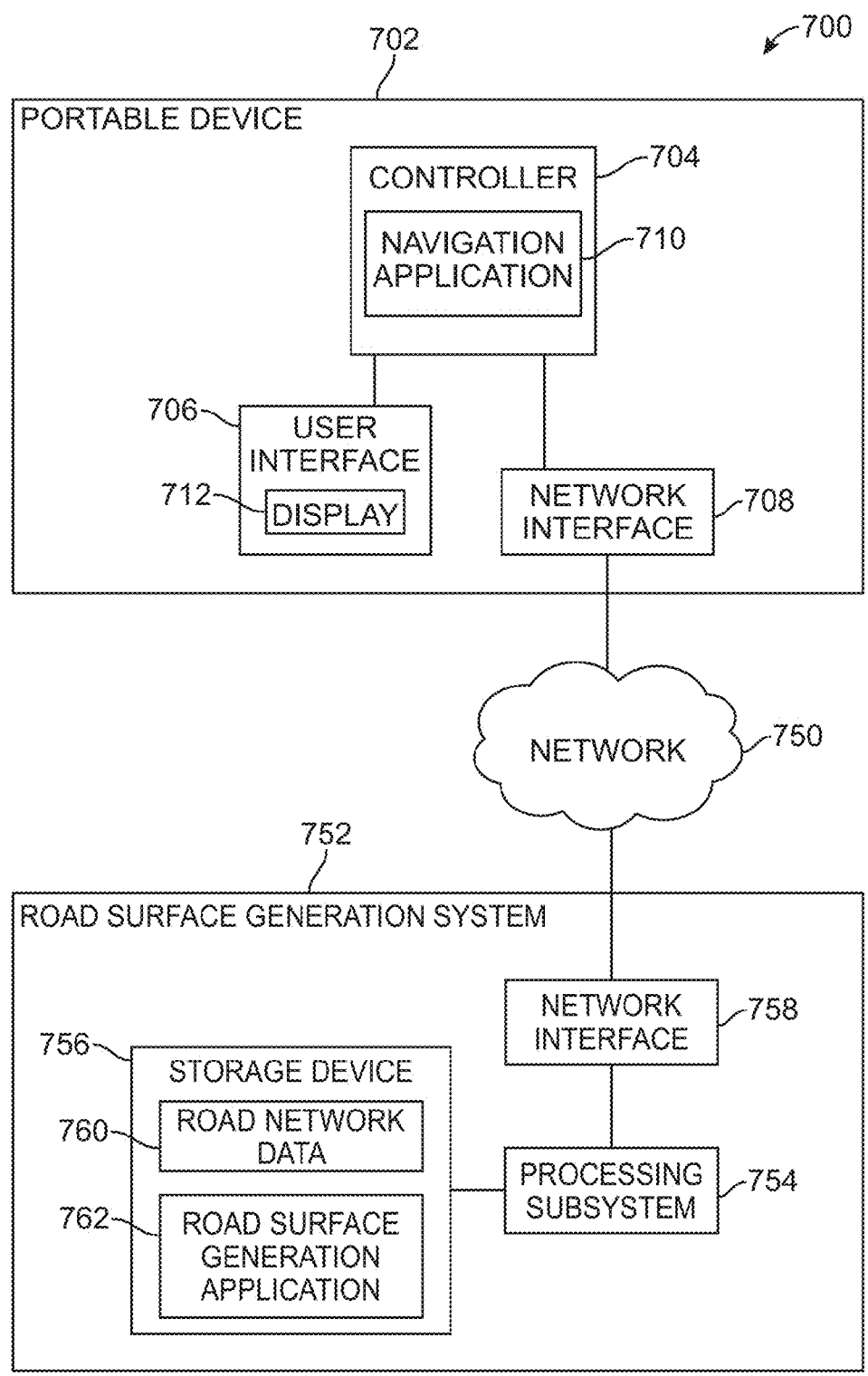
FIG. 7 is a block diagram of a system including a portable device and road surface generation system, according to an embodiment of the present invention.

FIG. 7 is a simplified block diagram of a system 700 including a portable device 702 and road surface generation system 752 according to an embodiment of the present invention. In this embodiment, portable device 702 can provide computing, communication, and/or navigation capability. Portable device 702 may be, for example, a device having a GPS navigation system, such as a dedicated GPS devices or a multipurpose device enabled to run a GPS navigation application. In some embodiments, portable device 702 can include standalone GPS devices, vehicle head units, and portable devices such as portable media players, smart phones, tablet computers, and laptop computers. Portable device 702 can include controller 704, user interface 706, and network interface 708.

Controller 704 can include, e.g., one or more single-core or multi-core microprocessors and/or microcontrollers executing program code to perform various functions associated with portable device 702. For example, through suitable programming, controller can execute a navigation application 710 stored on controller 704. Controller 704 can also execute other programs to control other functions of portable device 702.

User interface 706 can include input devices such as a touch pad, touch screen, scroll wheel, click wheel, dial, button, switch, keypad, microphone, or the like. User interface 706 may also include output devices, such as display 712. Display 712 may display navigation data including a depiction of a road passing over another road (e.g., navigation image 106 of FIG. 1). Additional output devices of user interface 706 may include indicator lights, speakers, headphone jacks, or the like, together with supporting electronics (e.g., digital-to-analog or analog-to-digital converters, signal processors, or the like). A user can operate input devices of user interface 706 to invoke the functionality of portable device 702 and can view and/or hear output from portable device 702 via output devices of user interface 706.

Network interface 708 can provide data communication capability for portable device 702. For example, portable device 702 can receive road height data from road surface generation system via network 750 at network interface 708. Network interface 708 can include receiver components for receiving GPS signals. The received GPS signals can allow navigation application 710 to determine the location of portable device 702 so that navigation application 710 can display a map indicating the current location on portable device 702 on display 712. Network interface 708 may include radio frequency (RF) transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), components for short-range wireless networking (e.g., using Bluetooth standards), and/or other components. Network interface 708 can provide wired network connectivity (e.g., Ethernet) in addition to or instead of a wireless interface. Network interface 708 can be implemented using a combination of hardware (e.g., driver circuits, antennas, modulators/demodulators, encoders/decoders, and other analog and/or digital signal processing circuits) and software components.

Portable device 702 can also include other components (not explicitly shown). For example, in various embodiments portable device 702 can include one or more storage devices using fixed or removable storage media. Navigation application 710 may be stored by a storage device and executed by controller 704. Road network data, such as received road height values, may also be stored by a storage device of portable device 702. Portable device 702 may include a battery, power controllers, and other components operable to provide various enhanced capabilities. At any given time, some or all of the program code to be executed can be resident in controller 704 and/or in storage media.

Road surface generation system 752 can include processing subsystem 754, storage device 756 and network interface 758. Road surface generation system 752 can be implemented at a server or a server farm. Various road surface generation systems may include components not explicitly shown in FIG. 7, including but not limited to user interface components (keyboard, display, etc.).

Processing subsystem 754, also referred to as a "computing device," can be implemented as one or more integrated circuits, e.g., one or more single-core or multi-core microprocessors or microcontrollers, examples of which are known in the art. In operation, processing system 754 can control the operation of road surface generation system 752. In various embodiments, processing subsystem 754 can execute a variety of programs in response to program code and can maintain multiple concurrently executing programs or processes. At any given time, some or all of the program code to be executed can be resident in processing subsystem 754 and/or in storage media such as storage device 756.

Storage device 756 can be implemented, e.g., using disk, flash memory, or any other non-transitory storage medium, or a combination of media, and can include volatile and/or nonvolatile media. Storage device 756 can store data, such as road network data 760. For example, storage device 756 may include a database in which road network data 760 is stored. In some embodiments, storage device 756 can store one or more application programs to be executed by processing subsystem 754. For example, storage device 756 can store road surface generation application 762, which can be executed by processing subsystem 754. Road surface generation application 762 can use an optimization algorithm to determine road heights for a roadway network based on input data including locations of junctions and the stacking order of roads at grade separated crossings. The road heights determined by road surface generation application 762 can be transmitted from road surface generation system 752 to portable device 702.

Network interface 758 can provide data communication capability for road surface generation system 752. For example, from road surface generation system 752 can provide road surface data to portable device 702 via network interface 758. Network interface 758 can provide wired network connectivity (e.g., Ethernet) to connect road surface generation system 752 to network 750 (e.g., the Internet). Network interface 758 can provide wireless network connectivity (e.g., RF, Bluetooth, WiFi, etc.) in addition to or instead of a wired interface. Network interface 758 may include communication components such as radio frequency (RF) transceiver components, components for short-range wireless networking, and/or other components. Network interface 758 can be implemented using a combination of hardware (e.g., driver circuits, antennas, modulators/demodulators, encoders/decoders, and other analog and/or digital signal processing circuits) and software components.

It will be appreciated that the system configurations and components described herein are illustrative and that variations and modifications are possible. The portable device and/or accessory may have other capabilities not specifically described herein (e.g., mobile phone, global positioning system (GPS), broadband data communication, Internet connectivity, etc.).

Further, while the portable device and road surface generation system are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

In some embodiments, one or more of road network data 760 and road surface generation application 762 can be stored on portable device 702, for example, in controller 704 or in a storage device of portable device 702. The road surface generation application can be executed by controller 704. Accordingly, in some embodiments, system 700 may not include road surface generation system 752.

Embodiments can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method for generating polygons of a road surface for a road network area that includes a plurality of junctions, the method comprising:
   receiving a junction data set for each junction in the road network area, wherein each junction data set includes a first coordinate and a second coordinate;
   receiving a non-junction data set for each non-junction location in the road network area, wherein each non-junction location includes a first coordinate and a second coordinate, the non-junction data set defining locations of road segments between junctions;
   determining, by a computing device, height values of the road segments at each junction;
   for each of a plurality of road segments:
      computing, by the computing device, a height function defining a change in height of the road segment between the corresponding two junctions;
      for each non-junction location of the road segment:
         calculating a yaw vector using a two dimensional vector between the non-junction location and a successive location, wherein a road element connects the non-junction location and the successive location;
         determining a pitch using a change in the height function at the non-junction location; and
         determining a roll based on one or more road parameters;
      for each road element of the road segment:
         constructing, by the computing device, a set of polygons based on:
            a road width at the two locations which the road element is between,
            the pitch at each of the two locations,
            the yaw vector at each of the two locations, and
            the roll at each of the two locations; and
   transmitting, from the computing device to a display device, data based on the set of polygons for displaying, by the display device, a three-dimensional map of a part of the road network area.

2. The method of claim 1, wherein determining the pitch using the change in the height function at the non-junction location includes:
   calculating a value of a first derivative of the height function at the non-junction location.

3. The method of claim 1, wherein determining the pitch using the change in the height function at the non-junction location includes:
   calculating height values at the non-junction location and at the successive location using the height function;
   calculating a difference in the height values between the non-junction location and the successive location.

4. The method of claim 1, wherein the height function includes:
   a transform subfunction that receives, as input, a two dimensional distance t of a location from a start junction of a road segment to the location measured along the road segment in a two dimensional plane defined by the corresponding first and second coordinates and outputs a transformed distance t'; and
   a height subfunction h(t') that receives, as input, the transformed distance t' and outputs a height at the two dimensional distance t.

5. The method of claim 4, wherein determining the pitch using the height function at a non-junction location includes:
   determining the two-dimensional distance t corresponding to the non-junction location;
   calculating the transformed distance t' of the non-junction location by evaluating the transform subfunction; and
   calculating a value of a first derivative of the height function h(t') at the transformed distance t'.

6. The method of claim 4, wherein the transform subfunction includes a function l(t'), where $l(t')=a_l t'^3+b_l t'^2+c_l t'+d_l$, where $a_l=-2L_r+c_{r,s}+c_{r,e}$, $b_l=3L_r-2c_{r,s}-c_{r,e}$, $c_l=c_{r,s}$, and $d_l=0$, wherein $L_r$ is the length of the road segment r in two dimensions, and $c_{r,s}$ and $c_{r,e}$ are scalars that are functions of $L_r$, where t' runs from 0 to 1, and
   wherein t' is determined from the equation $l(t')=t \cdot L_r$.

7. The method of claim 4, wherein the height subfunction h(t') of a road segment r is defined as:
   $h(t')=a_h t'^3+b_h t'^2+c_h t'+d_h$, where $a_h=2h_s-2h_e$, $b_h=-3h_s+3h_e$, $c_h=0$, and $d_h=h_s$, and wherein $h_{r,s}$ is a height of start junction and $h_{r,e}$ is a height of an end junction.

8. The method of claim 1, wherein the height function is defined to have a maximum slope at a median point between the two corresponding junctions.

9. The method of claim 8, wherein a sign of the curvature of the height function changes at the median point.

10. The method of claim 1, wherein the height function includes a cubic Hermite spline.

11. The method of claim 1, further comprising:
    constructing, by the computing device, road surface data for each road of the road network area based on the set of polygons; and
    transmitting, from the computing device to the display device, the road surface data for rendering the three-dimensional map.

12. The method of claim 1, wherein determining height values of the road segments at each junction includes receiving the height values at the computing device.

13. The method of claim 1, wherein the one or more road parameters for determining the roll at a non-junction location include a speed limit of the road segment at the non-junction location.

14. The method of claim 1, wherein the one or more road parameters for determining the roll at a non-junction location include a curvature of the road segment at the non-junction location.

15. The method of claim 14, wherein the roll β at a non-junction location p is computed as:

$$\beta = k_0 \cdot B_{max} \cdot \frac{C_p}{|C_p|} \cdot \left(\frac{T_r}{T_{max}}\right)^{\gamma T} \cdot \left(\frac{|C_p|}{C_{max}}\right)^{\gamma C},$$

where $k_0$ is a scaling parameter, $c_p$ is the curvature at the non-junction location p, $c_{max}$ is maximum absolute curvature, γT and γC are parameters having values of at least 1, $B_{max}$ is a maximum of the roll, $T_r$ is a speed limit along the road segment, and $T_{max}$ is a maximum speed limit.

16. The method of claim 1, wherein the roll is computed after the yaw vector and the pitch.

17. The method of claim 16, wherein the yaw vector is computed first and the pitch second.

18. The method of claim 1, wherein each road segment is labeled with a road designation that is associated with junctions and non-junction locations of the respective road segment.

19. The method of claim 1, wherein the junction data sets include a stacking order for at least a portion of the junctions, and wherein the plurality of junctions include a plurality of grade separated crossings, a grade separated crossing including at least two roads having a different stacking order signifying that the at least two roads have different heights.

20. A computer product comprising a non-transitory computer readable medium storing a plurality of instructions that when executed control a computer system to generate polygons of a road surface for a road network area that includes a plurality of junctions, the instructions comprising:
    receiving a junction data set for each junction in the road network area, wherein each junction data set includes a first coordinate and a second coordinate;
    receiving a non-junction data set for each non-junction location in the road network area, wherein each non-junction location includes a first coordinate and a second coordinate, the non-junction data set defining locations of road segments between junctions;
    determining height values of the road segments at each junction;
    for each of a plurality of road segments:
        computing a height function defining a change in height of the road segment between the corresponding two junctions;
        for each non-junction location of the road segment:
            calculating a yaw vector using a two dimensional vector between the non-junction location and a successive location, wherein a road element connects the non-junction location and the successive location;
            determining a pitch using a change in the height function at the non-junction location; and
            determining a roll based on one or more road parameters; and
        for each road element of the road segment:
            constructing a set of polygons based on:
                a road width at the two locations which the road element is between,
                the pitch at each of the two locations,
                the yaw vector at each of the two locations, and
                the roll at each of the two locations; and
    transmitting, from the computing device to a display device, data based on the set of polygons for displaying, by the display device, a three-dimensional map of a part of the road network area.

21. The computer product of claim 20, wherein determining the pitch using the change in the height function at the non-junction location includes:
    calculating a value of a first derivative of the height function at the non-junction location.

22. The computer product of claim 20, wherein the height function includes:
    a length subfunction l(t) that receives, as input, a two dimensional distance t of a location from a start junction of a road segment to the location measured along the road segment in a two dimensional plane defined by the corresponding first and second coordinates; and
    a height subfunction h(t') that receives as input a three dimensional distance t' of the location as determined from the length subfunction.

23. The computer product of claim 20, wherein the one or more road parameters for determining the roll at a non-junction location include a speed limit and a curvature of the road segment at the non-junction location.

24. The computer product of claim 20, wherein yaw vector is computed, then the pitch, and then the roll.

25. The computer product of claim 20, wherein the instructions further comprise:
    constructing road surface data for each road of the road network area based on the set of polygons; and
    transmitting, to the display device, the road surface data for rendering the three-dimensional map.

26. A device for generating polygons of a road surface for a road network area that includes a plurality of junctions, the device comprising one or more processors configured to:
    receive a junction data set for each junction in the road network area, wherein each junction data set includes a first coordinate and a second coordinate;
    receive a non-junction data set for each non-junction location in the road network area, wherein each non-junction location includes a first coordinate and a second coordinate, the non-junction data set defining locations of road segments between junctions;
    determine height values of the road segments at each junction;
    for each of a plurality of road segments:
        compute a height function defining a change in height of the road segment between the corresponding two junctions;
        for each non-junction location of the road segment:
            calculate a yaw vector using a two dimensional vector between the non-junction location and a successive location, wherein a road element connects the non-junction location and the successive location;
            determine a pitch using a change in the height function at the non-junction location; and
            determine a roll based on one or more road parameters; and
        for each road element of the road segment:
            construct a set of polygons based on:
                a road width at the two locations which the road element is between,
                the pitch at each of the two locations,
                the yaw vector at each of the two locations, and
                the roll at each of the two locations; and
    transmit, from the computing device to a display device, data based on the set of polygons for displaying, by the display device, a three-dimensional map of a part of the road network area.

* * * * *